Aug. 21, 1956 W. D. ANDERSON 2,759,778
SEALED BEARING
Filed Aug. 31, 1954 3 Sheets-Sheet 1

*INVENTOR.*
WARREN D. ANDERSON
BY John P. Chandler
*his* ATTORNEY.

INVENTOR.
WARREN D. ANDERSON
BY John P. Chandler
his ATTORNEY.

Aug. 21, 1956 W. D. ANDERSON 2,759,778
SEALED BEARING
Filed Aug. 31, 1954 3 Sheets-Sheet 3

INVENTOR.
WARREN D. ANDERSON
BY John P. Chandler
his ATTORNEY.

United States Patent Office 2,759,778
Patented Aug. 21, 1956

2,759,778

SEALED BEARING

Warren D. Anderson, Glenbrook, Conn., assignor to Norma-Hoffman Bearings Corporation, Stamford, Conn., a corporation of New York Application August 31, 1954, Serial No. 453,195

10 Claims. (Cl. 308—187.2)

This invention relates to separable anti-friction bearings and relates more particularly to a novel sealed bearing structure wherein the sealing means insures retention of the lubricant and prevents foreign particles from entering the sealed cavity and wherein the inner race member may be readily inserted into and removed from the outer member.

An object of the present invention is to provide a sealed bearing of the type which is packed with grease or other lubricant and wherein the inner and outer race members may be separately applied to the shaft, and to the housing or frame, respectively.

Roller or ball bearing structures of the sealed variety usually have sufficient lubricant for the normal life of the bearing and the inner and outer race members are generally so constructed that after they have been assembled by the maker they cannot be disassembled and reassembled without the necessity of removing or replacing of the sealing members or other parts. In bearings of this character it is impossible for the user to independently fit the inner ring to the shaft and the outer ring to the housing and then to subsequently assemble the shaft into the housing.

The readily separable bearing structure of the present invention has many advantages. It is frequently desirable to press fit the inner ring to the shaft and press fit the outer ring in the frame or housing. If the inner and outer bearing rings are not readily separable there is always the danger that the heavy pressure required to accomplish these press fits may be partially transmitted through the balls or rollers within the bearing and thus damage the raceways.

A separable bearing is especially useful in production line assembly operations wherein the user may mount the inner rings on shafts on one assembly line and mount the outer rings in housings on a separate line, all prior to final assembly on a third line at a later and more convenient time.

An important object of the present invention is to provide a readily separable bearing structure wherein no parts need be replaced during the process of removing the inner ring from the outer ring assembly and wherein the lubricant packed within the sealed bearing is not dissipated during the process.

Another object of the invention is to provide a separable, grease-packed bearing wherein substantially no lubricant can pass out of the sealed enclosure during normal operation and wherein dirt and other foreign particles from without are denied admission, all due primarily to a novel elastic ring positioned in an annular groove in one of the race members and which has an expanding or contracting action and which effects a sealing engagement with a cylindrical surface in the second race member.

Either of the sealed bearings embodying the present invention may have the sealing elements on both sides of the bearing members or they may have it at one side only as in the case of a motor or generator wherein one end of the shaft does not project from the housing, in which case only one side is sealed in order to prevent the lubricant from entering the motor housing.

Figure 1:
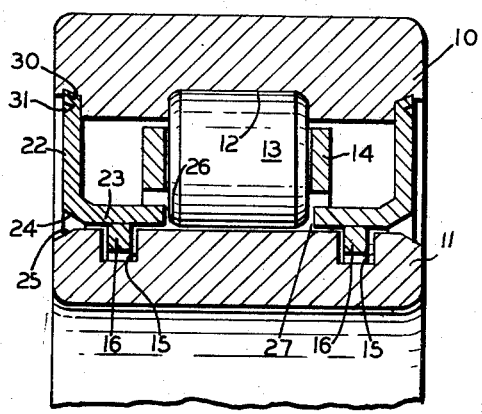
Fig. 1 is a broken section taken through a sealed bearing embodying the present invention.
Figure 2:
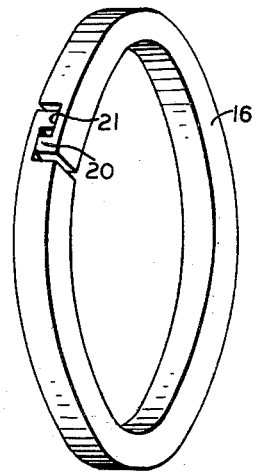
Fig. 2 is a perspective view of one type of an elastic sealing ring which may be employed in connection with the present invention.

The invention is illustrated in its first form as being applied to a roller bearing structure and includes an outer race member 10 and an inner race member 11. No particular means are shown for securing the outer race to a housing but this may include an external locking ring received in an annular recess in the member or other suitable means. The member has an internal annular raceway 12 in which are positioned a plurality of rollers 13 which are maintained in their spaced relation by means of a retainer 14.

The inner race member is formed with spaced annular grooves 15 on its outer periphery in which are positioned elastic sealing rings 16. The width of the groove is greater than the width of the ring and its depth may be of substantially the same depth as the radial thickness of the ring so that when the latter is expanded to its normal limit it may have free floating movement within the groove.

The elastic sealing ring can be either a continuous ring or a split ring. In the event of the former it may be made from resilient material such as rubber, plastics, composition materials or combinations thereof. If an expanding split ring is employed it may have interlocking means to limit its expansion. Conveniently this may include terminal portions 20 of reduced width and square milled notches 21 spaced from these portions which form seats for the terminals. Except for this hook-type of interlock the ring would tend to spring outwardly and the ring ends would separate.

The grease or other lubricant (not shown) is confined between the inner and outer race members by means of annular side plates having outer faces 22 lying generally normal to the axis of the inner race member and inwardly extending annular base flanges or sleeves 23. Between these two sections of the plate there is formed a beveled annular face 24 and the inner race member also has a beveled external face 25 at its opposed edges, both for a purpose to be described. It will be noted that the inner edge of sleeve 23 is spaced a distance from the roller which is rounded at 26 and that this space, indicated at 27, has a lesser width than the width of the elastic sealing ring. These rings expand into engagement with the cylindrical interior surface of sleeve 23 and form a sealing contact therewith.

The side plates may be mounted in the outer race member in any conventional manner, such as by forming an annular seat 30 therefor and then staking the plate as at 31 to secure it in the seat. A split snap ring could also be used for the purpose.

Figure 3:
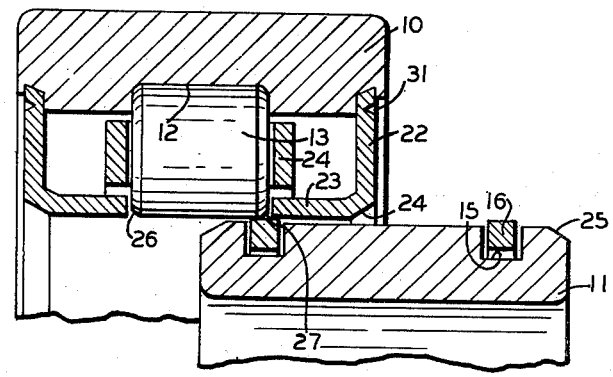
Fig. 3 is similar to Fig. 1 but shows the inner race member partially removed from the outer race member.

To remove the inner race member it is only necessary to slide it axially with reference to the outer member as shown in Fig. 3 and when one split sealing ring 16, shown at the right in Fig. 3, has been freed from the confining influence of sleeve 23 it springs outwardly to the limit of its diameter determined by the proportions of its notched terminals.

Figure 4:
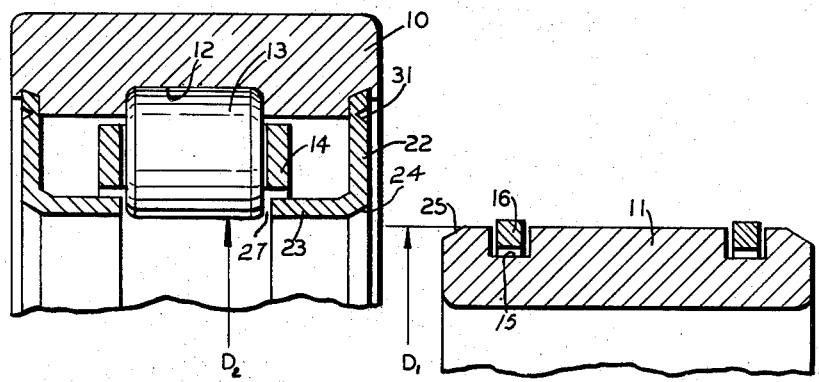
Fig. 4 is an exploded view similar to Fig. 3 but showing the inner race member completely removed from the outer race member.

By referring to Fig. 4 it will be noted that between the groove and the face of the inner race member the diameter of the inner race member, indicated as $D_1$, is less than the diameter of a circle inscribed within the anti-friction elements, indicated as $D_2$. This permits assembly and disassembly. In assembling the inner ring into the outer ring and rollers the cooperating beveled surfaces 24 and 25 aid in centering the parts. The first expanded split ring to contact the outer race structure will engage the beveled surface 24 of the annular side plate and its diameter will be constricted sufficiently to enable it to readily pass into the sleeve. While so confined its leading edge will span space 27 and contact the rounded edges 26 of the rollers and when this ring has passed beyond the opposite sides of the rollers it will again open slightly and be confined by the opposite sleeve. During the course of this movement of the inner ring into the outer ring the split ring on the right of the inner ring will contact beveled surface 24 and will be constricted sufficiently to allow it to move into the sleeve. Both split rings are now in expanding sealing engagement with the cylindrical surfaces of the sealing plates.

No substantial quantity of grease will be lost during assembly and disassembly and if more grease is required it is a simple matter to force additional grease into the areas between the side plates and the rollers.

By forming the sealing plate with a flat annular section 22 and a cylindrical section 23 there is provided a considerable volume for the grease. This member could, of course, be formed as a solid ring which is substantially rectangular in transverse section.

Figure 5:
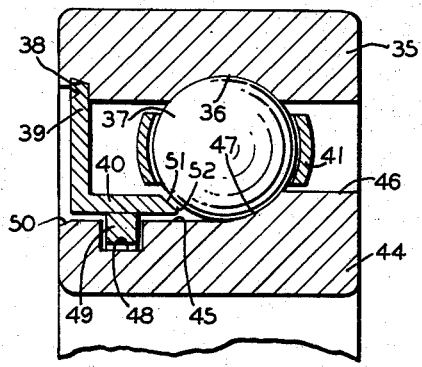
Fig. 5 is a broken section showing a modified form of the invention employing balls as the anti-friction elements and also showing the sealing arrangement on one side only of the bearing structure.

The modified form of the invention shown in Fig. 5 employs balls as the anti-friction elements. A sealing plate for the lubricant is provided on one side only so the inner race member can be removed in one direction only, i. e., to the right, while the balls are in place.

The outer race member 35 is formed with a raceway 36 for the balls 37 and an annular seat 38 for the side plate 39 having the inwardly extending sleeve 40. The balls are maintained in their spaced relation by retainer 41.

The inner ring 44 has a section 45 on its outer periphery of lesser diameter and another section 46 of greater diameter, the two sections being joined by a curved section 47 which forms the raceway. Section 45 has an annular groove 48 for the elastic sealing ring 49 and its outer edge is beveled at 50.

The inner face 51 of the sleeve is beveled in order to reduce the width of the gap and accordingly prevent the split ring from becoming entrapped therein during assembly or disassembly.

Figure 6:
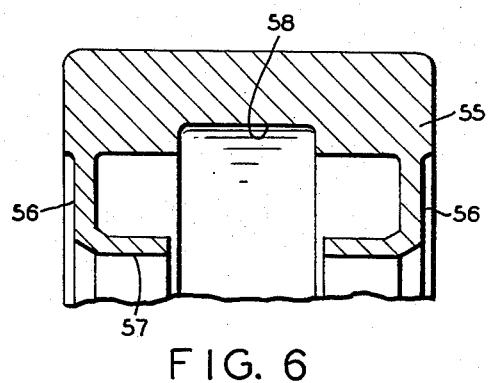
Fig. 6 is a broken section of an outer ring wherein the sealing plate is formed integrally therewith.

In the modified form of the invention shown in Fig. 6 the outer race ring 55 and the sealing plates are formed integrally, each of the latter including an outer annular radial section 56 and a cylindrical section 57 extending radially inwardly therefrom. The ring is formed with an internal raceway 58. In view of the non-removability of the sealing plates in this form the rollers are simply inserted in the raceway without the benefit of retainers.

The inner ring structure may be identical with that shown in Fig. 1 with the split ring 16 expanding into sealing contact with the inner annular surface of cylindrical section 57.

Figure 7:
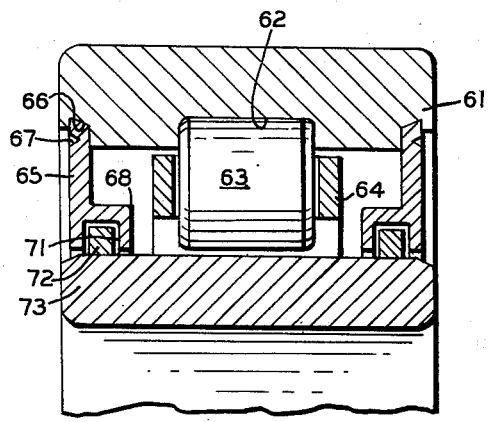
Fig. 7 is a broken section showing a modified construction wherein the elastic sealing rings are in contracting sealed relation with its inner race ring.

Fig. 7 illustrates the final form of the invention wherein the outer ring 61 is formed with an internal raceway 62 for the rollers 63 which are supported by retainers 64. Each sealing plate 65 is carried by the outer ring and in the arrangement shown an annular groove 66 is formed to receive the outer annular edge of the plate, the latter being secured therein as by staking the same as shown at 67. The sealing plate has an inner section 68 extending radially inwardly and is formed with an internal annular groove 71.

The elastic sealing rings 72 in this instance are of the contracting type rather than the expanding type of Fig. 1 and they exert a constrictive action on the outer surface of inner race ring 73 and rotate therewith. The dimensions of the groove relative to the cross-sectional area of the ring are similar to that shown in Fig. 1 to permit the ring to have a free floating movement in the groove. In this arrangement it is not necessary to provide the hooked ends of the split ring. It is preferred that the terminals should have a step-cut lap joint such as is shown in Fig. 4 of Lighthall Patent No. 1,895,167.

Figure 8:
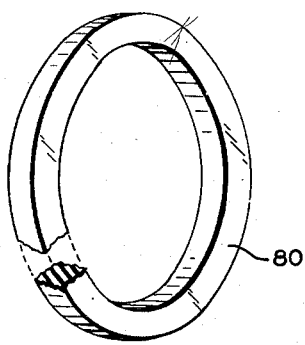
Fig. 8 is a perspective view showing a continuous elastic sealing ring.

Fig. 8 shows a continuous ring 80 formed of resilient material including rubber. This sealing ring may be employed in connection with any of the embodiments of the invention.

While four forms or embodiments of the invention have been shown and described herein for illustrative purposes, and the construction and arrangement incidental to four specific applications thereof have been disclosed and discussed in detail, it is to be understood that the invention is limited neither to the mere details or relative arrangement of parts, nor to its specific embodiments shown herein, but that extensive deviations from the illustrated forms or embodiments of the invention may be made without departing from the principles thereof.

What I claim is:

1. A separable anti-friction bearing comprising an inner race member, an outer race member provided with a plurality of anti-friction elements and having an internal annular raceway to receive the latter, the outer race member being provided at one end thereof with a sealing plate, the inner surface of said sealing plate being cylindrical and forming one annular element in a sealing structure, the adjacent outer surface of the inner race member forming a second annular element in said sealing structure, one of said annular elements having an annular groove therein, an elastic sealing ring loosely positioned within said groove and being in elastic engagement with the other annular element and forming a sealing contact therewith, the diameter of the inner race member between said groove and the adjacent outer face of said member being less than the diameter of a circle inscribed within the anti-friction elements to permit the inner member to be removed from the outer member.

2. A separable anti-friction bearing comprising an inner race member having an annular groove on its outer surface, an elastic sealing ring positioned within said groove, an outer race member provided with a plurality of antifriction elements, an annular sealing plate carried by the outer member on one side of the anti-friction elements and having a cylindrical interior surface which is engaged by the sealing ring to form a sealing contact therewith, the diameter of the inner race member between said groove and the adjacent outer face of said member being less than the diameter of a circle inscribed within the anti-friction elements, to permit the inner member to be removed from the outer member.

3. A separable anti-friction bearing comprising an inner race member having an annular groove on its outer surface, an elastic sealing ring positioned within said groove, interlocking means between the terminals of the elastic ring to limit the expansion thereof, an outer race member provided with a plurality of anti-friction elements, an annular sealing plate carried by the outer member on one side of the anti-friction elements and having a cylindrical interior surface which is engaged by the sealing ring to form a sealing contact therewith, the outer diameter of the inner race member between the groove and the adjacent outer face of the inner race member being less than the diameter of a circle inscribed within the anti-friction elements to permit the inner member to be removed from the outer member.

4. A separable anti-friction bearing comprising an inner race member having an annular groove on its outer surface, an elastic sealing ring positioned within said groove, an outer race member provided with a plurality of anti-friction elements, an annular sealing plate carried by the outer member on one side of the anti-friction elements and having a cylindrical sleeve whose inner surface is engaged by the sealing ring to form a sealing contact therewith, the sleeve being spaced from the anti-friction elements, the width of the elastic ring being greater than the width of said space, the outer diameter of the inner race member between the groove and the adjacent outer face of said member being less than the diameter of a circle inscribed within the anti-friction elements to permit the inner member to be removed from the outer member.

5. A separable anti-friction bearing comprising an outer race member providing with a plurality of anti-friction elements, an inner race member having on each side thereof an annular groove on its outer surface, a split, expanding sealing ring positioned within each groove, a sealing plate secured within the outer member at each end thereof and formed with an inwardly extending sleeve having an inner cylindrical surface and whose inner edge is spaced from the anti-friction elements, the split ring expanding into sealing contact with said cylindrical surface, the width of the ring being greater than the width of said space, the diameter of the inner member being less than the diameter of a circle inscribed within the anti-friction elements, whereby the inner member and ring carried thereby is readily removable from the outer member.

6. An anti-friction bearing comprising an outer race member provided with a plurality of anti-friction elements, an inner race member, a sealing ring secured within the outer member and formed with an inner cylindrical surface which is concentric with the axis of rotation of the inner member, the inner member having an external annular groove on at least one side thereof, a split, expandible sealing ring positioned within said groove and having an expanding engagement with said cylindrical surface, the largest diameter of the inner member being not gerater than the diameter of a circle inscribed within the anti-friction elements, whereby the inner member and ring carried thereby is readily removable from the outer member.

7. A separable anti-friction bearing comprising an outer race member provided with a plurality of anti-friction elements, an inner race member having on one side thereof an annular groove on its outer surface, an elastic, expanding sealing ring positioned within said groove, a sealing plate secured within the outer member and having a cylindrical interior surface which is engaged by the sealing ring to form a sealing contact therewith, the diameter of the exterior surface of the inner member on the groove side being less than the diameter of a circle inscribed within the anti-friction elements, a portion of enlarged diameter on the opposite side and an arcuate annular section therebetween forming a race for the anti-friction elements, whereby the inner member and ring carried thereby is readily removable from the outer member on one side thereof.

8. A separable anti-friction bearing comprising an outer race member provided with a plurality of antifriction elements, an inner race member having on one side thereof an annular groove on its outer surface, an elastic expanding sealing ring positioned within said groove, a sealing plate secured within the outer member and having a cylindrical interior surface which is engaged by the sealing ring to form a sealing contact therewith and whose inner edge is spaced from the anti-friction elements, the width of the ring being greater than the width of said space, the diameter of the exterior surface of the inner member on the groove side being less than the diameter of a circle inscribed within the antifriction elements, a race for the latter formed on said exterior surface, the diameter of the inner member on the opposite side of the race being larger, whereby the inner member and the sealing ring carried thereby is readily removable from the outer member.

9. A separable anti-friction bearing comprising an inner race member, an outer race member provided with a plurality of anti-friction elements and having an internal annular raceway to receive the latter, an annular sealing plate secured to the outer member at one end thereof and provided with an inner cylindrical surface which is concentric with and spaced from the adjacent outer surface of the inner member, said section having an annular groove therein, an elastic sealing ring expanded over the outer surface of inner member and forming a sealing contact therewith, said sealing ring being loosely positioned in said groove, the outer diameter of the inner member between the groove and the outer face of said inner member being less than the diameter of a circle inscribed within the anti-friction elements to permit the inner member to be readily removed from the outer member.

10. A separable anti-friction bearing comprising an inner race member, an outer race member provided with a plurality of anti-friction elements and having an internal annular raceway to receive the latter, an annular sealing plate secured to the outer member at one end thereof and provided with a section extending axially inwardly and presenting a cylindrical surface which is concentric with and spaced from the adjacent outer surface of the inner member, said section having an annular groove therein, an elastic sealing ring loosely positioned in said groove, said split ring exerting a contracting action on the outer surface of the inner member to form a sealing contact therewith, the outer diameter of the inner member being less than the diameter of a circle inscribed within the anti-friction elements to permit the inner member to be readily removed from the outer member.

References Cited in the file of this patent

UNITED STATES PATENTS

| 1,722,489 | Bott | July 30, 1929 |
| 1,895,167 | Lightball | Jan. 24, 1933 |

FOREIGN PATENTS

| 995,524 | France | Dec. 4, 1951 |